US007421880B2

(12) United States Patent
Buttolo et al.

(10) Patent No.: US 7,421,880 B2
(45) Date of Patent: Sep. 9, 2008

(54) SWITCH FEEL MEASUREMENT SYSTEM CALIBRATION

(75) Inventors: Pietro Buttolo, Dearborn Heights, MI (US); James Rankin, II, Novi, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 11/382,403

(22) Filed: May 9, 2006

(65) Prior Publication Data

US 2007/0295106 A1   Dec. 27, 2007

(51) Int. Cl.
*G01L 25/00*   (2006.01)
*G01L 5/16*    (2006.01)
*G01L 3/14*    (2006.01)
(52) U.S. Cl. .................. 73/1.09; 73/862.322; 702/41
(58) Field of Classification Search ............... 79/740; 73/1.08–1.11, 1.84, 862.322; 702/41, 113–115
See application file for complete search history.

(56) References Cited

U.S. PATENT DOCUMENTS 5,795,990 A * 8/1998 Gitis et al. ............ 73/9
6,557,245 B2 * 5/2003 Beduhn et al. ............ 29/724

OTHER PUBLICATIONS

S. Yang, H. Tan, P. Buttolo, M. Johnston, Z. Pizlo, "Thresholds for Dynamic Changes in a Rotary Switch", Proceedings of EuroHaptics 2003, Dublin, Ireland, Jul. 2003.*

* cited by examiner

*Primary Examiner*—Edward Lefkowitz
*Assistant Examiner*—Punam Patel
(74) *Attorney, Agent, or Firm*—David B. Kelly; MacMillan, Sobanski & Todd, LLC.

(57) ABSTRACT

A method may be employed to assure that a switch measurement system accurately measures a torque/angular displacement profile for a rotary switch. A procedure may be employed that aligns the rotational axis of the switch with the rotational axis of the measurement unit of the switch measurement system. Also a procedure may be employed that monitors secondary forces to assure that proper alignment and calibration has been achieved.

19 Claims, 3 Drawing Sheets

SWITCH FEEL MEASUREMENT SYSTEM CALIBRATION

BACKGROUND OF INVENTION

The present invention relates to measuring human/mechanism interfaces, and more particularly to such measuring systems that relate to the measurement of relatively small one degree of freedom mechanisms, such as switches.

As the market for sales of products becomes more competitive, a manufacturer must distinguish its products from the competition. Thus, a product design may require more than providing the proper function—it may also require providing a certain feel or image for the product. For example, a small mechanism, such as a switch, may need to not only perform its function of adjusting the operation of a product, but also provide a certain feel to the switch operator while being actuated. Such a switch feel may give an impression of quality or distinctiveness to the product, and one may wish to have this particular feel for all of the switches on a given product—that is, a switch feel harmony. Thus, the feel of a switch may be almost as important as the function the switch performs. In order to define and achieve this feel, the human/machine interface for that particular switch must be defined.

In addition, for many manufacturers, the switches are fabricated by multiple suppliers. In order to maintain switch feel harmony, then, one must be able to not only define the switch feel characteristics in a quantitative and objective manner, but also posses an ability to measure the switches produced by the suppliers, in an accurate and reliable way, in order to verify that the switches meet the criteria. Consequently, an accurate and repeatable way to define and measure switches is needed.

Conventionally, measurements for determining characteristics of switches were accomplished by mounting the switches in laboratory type fixtures and connecting them to a switch measurement device. Typically, these measurement devices measured the peak force that was applied during switch actuation and possibly also the range of motion. But peak force alone cannot completely define the human perception of feel. Two switches having the same peak force can feel quite differently. Consequently, the feel of such switches was mostly determined by consensus in panel studies. These conventional approaches, however, do not produce a quantitative, objective, verifiable, and repeatable means for completely measuring the feel of a switch.

As a result, some of the more advanced systems employ a laboratory type fixture with a more advanced measurement device that can measure the force applied to the switch as the switch moves through its range of motion. This force/displacement profile (or torque/angular displacement for a rotary switch), then, provides a more complete definition of the switch properties. For switches that rotate though, the switch measurement system must be able to properly grip and/or contact the switch while rotating the switch about its pivot axis. Moreover, to precisely and repeatably measure the torque/angular displacement characteristics of rotary switches, an accurate alignment of the axis of the switch measurement unit with the rotary switch being measured is required. Merely a rough visual alignment, as has been done in the past, will generally yield inconsistent and less accurate results than is desired for defining and verifying the switch feel characteristics of a switch.

SUMMARY OF INVENTION

According to an embodiment of the invention, there is provided a method for minimizing errors associated with measuring torque/angular displacement profiles of a rotary switch, the method comprising the steps of: mounting the rotary switch with a switch axis parallel to a measurement axis for a measurement unit of a switch measuring system; moving the rotary switch through a range of motion with the measurement unit while measuring at least one secondary force; comparing the at least one secondary force to a predetermined force limit; and determining that the rotary switch is not properly aligned if the at least one secondary force is not less than the predetermined force limit.

According to an embodiment of the invention, there is provided a method for aligning a switch axis of a rotary switch to be measured with a measurement axis of a measuring unit of a switch measuring system, the method comprising the steps of: mounting the rotary switch with the switch axis parallel to the measurement axis; moving the rotary switch through a range of motion with the measurement unit while measuring a first secondary force that is parallel to the measurement axis and a second secondary force that is perpendicular to the switch measurement axis; comparing the first secondary force to a first predetermined force limit; comparing the second secondary force to a second predetermined force limit; and adjusting a position of the switch axis relative to the measurement axis if the first secondary force is not less than the first predetermined force limit or the second secondary force is not less than the second predetermined force limit.

According to an embodiment of the invention, there is provided a method for obtaining feedback indicative of proper alignment of a switch axis of a rotary switch with a measurement axis of a measurement unit of a switch measuring system, the method comprising the steps of: mounting the rotary switch; moving the rotary switch through a range of motion with the measurement unit while measuring a first secondary force and a second secondary force that is perpendicular to the first secondary force; comparing the first secondary force to a first predetermined force limit; comparing the second secondary force to a second predetermined force limit; and determining that the rotary switch is not properly aligned with the measurement unit if the first secondary force is greater than the first predetermined force limit or the second secondary force is greater than the second predetermined force limit.

An advantage of an embodiment is that the analytical method for aligning and verifying the alignment for the switch measuring system relative to a rotary switch being tested provides accurate, repeatable and verifiable switch measurement profiles.

An advantage of an embodiment is that the alignment can be verified through monitoring of particular forces (i.e., force feedback) during the testing of a rotating type switch.

An advantage of an embodiment is that the alignment process, while being precise, is also relatively easy and quick to administer.

DETAILED DESCRIPTION

Figure 1:
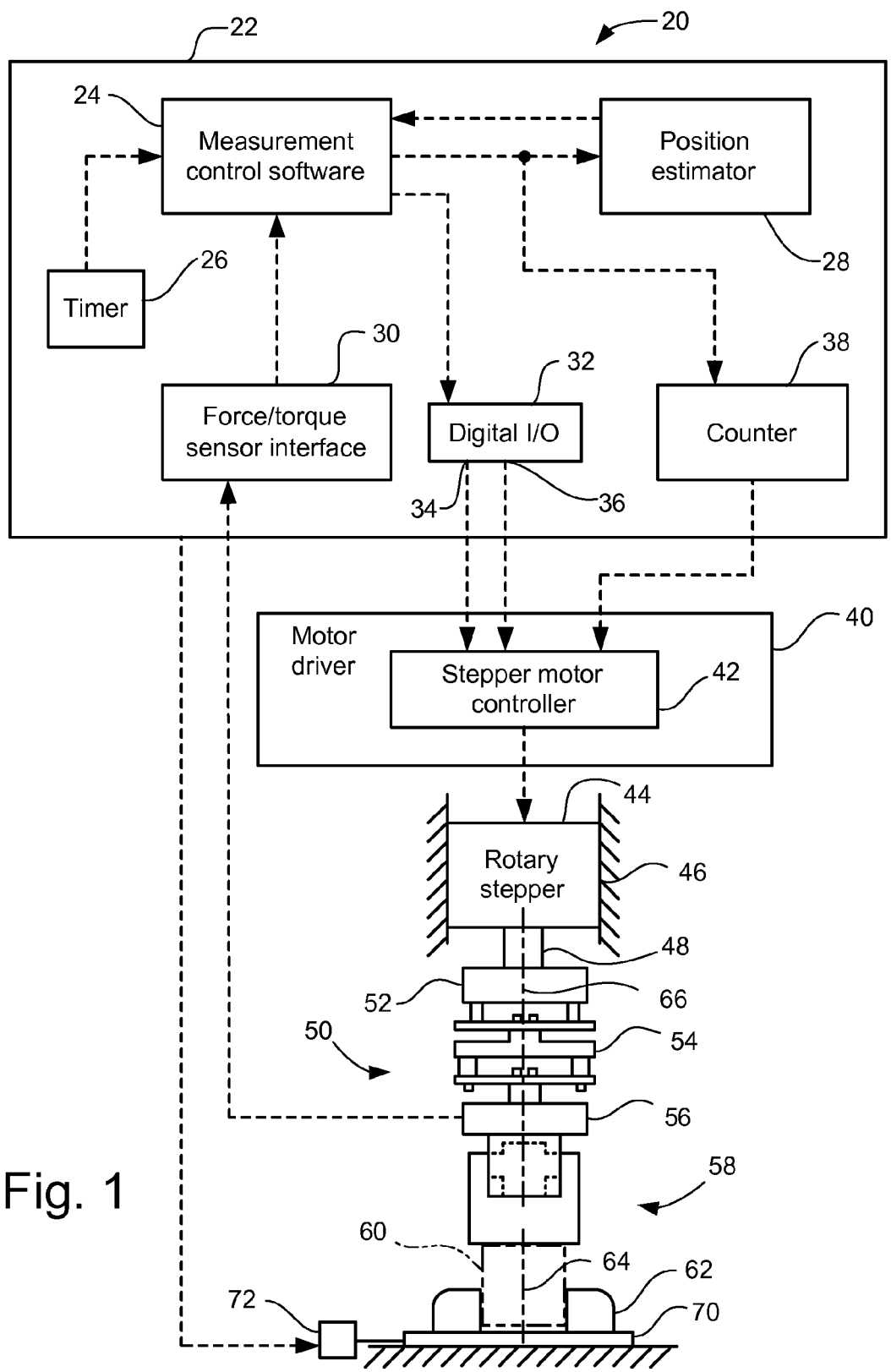
FIG. 1 is a schematic diagram of an overall switch measurement system in accordance an embodiment.

FIG. 1 illustrates a portion of a switch measuring system 20, which is optimally employed for accurately measuring a torque/angular displacement profile for small one degree of freedom mechanisms, such as switches. The switch measurement system 20 is, in effect, a type of physical impedance meter. That is, it can measure resistance to the motion of a mechanism as it travels along its predefined path, such as, for example, static friction, dynamic friction, inertia, weight, spring forces, and air pressure. These forces give the mechanism its feel characteristics as a human moves the mechanism along its path.

The switch measurement system 20 includes a control unit 22, such as, for example, a general purpose computer running a general purpose operating system, such as a MICROSOFT WINDOWS™ operating system, produced by Microsoft Corporation, of Redmond, Wash. The control unit can also be a special purpose computer, if so desired. The control unit 22 includes a graphical user interface to allow a user to see measured torque/angular displacement (or force/displacement) profiles. The dashed lines shown in FIG. 1 represent electrical (or other types of communication/power) connections between various system components.

In particular, the control unit 22 may include measurement control software 24 that receives input from a timer 26. The measurement control software 24 may also interface with position estimator software 28, and a force/torque sensor interface 30, (which may be on a separate interface card connected to the control unit 22). The measurement control software also interfaces with a digital input/output (I/O) 32, which may have an enable signal output 34 and a directional signal output 36. A counter algorithm 38 may receive input from the measurement control software 24. The digital I/O 32 and counter 38 may be on separate interface cards connected to the control unit 22, if so desired. The software 24 may include the graphical user interface, as discussed above, a storage routing to record, organize and store torque/angular displacement (or force/displacement) profiles, an editor to edit the motion paths, and an output routine to provide output data that accurately describes the torque/angular displacement profiles of a switch.

Electronically connected to the output from the control unit 22 is a motor driver 40, including a stepper motor controller 42. The stepper motor controller 42 has inputs for receiving output from the counter 38 as well as the enable signal output 34 and direction signal output 36 from the digital I/O 32. The computing system, software and motor controller discussed so far assumes that a rotary stepper motor 44 is employed. If one desires to employ a different type of motor, then the computing system, software and motor controller would, of course, be modified to interface with that type of motor. Although, a stepper motor is generally preferable since it can be easily controlled open loop.

The stepper motor controller 42 electronically interfaces with the motor 44, which is mounted to an adjustable fixture 46. The fixture 46 can be any type that will allow one to adjust it so as to locate and orient the motor 44 as needed for a particular switch being measured, and then secure the motor 44 in place. A motor shaft 48 extends from the motor 44 and engages a measurement unit, indicated generally at 50.

The measurement unit 50 may include a gear reductor 52, that may be connected to and rotationally driven by the motor shaft 48. A Naugler coupling 54 then may connect to and be driven by the gear reductor 52. The Naugler coupling 54 has the ability to couple shafts together while compensating for small amounts of angular, lateral and axial misalignment, and while providing essentially zero backlash and constant angular velocity between the shafts. The Naugler coupling 54 may then connect to and drive a force/torque sensor 56. The force/torque sensor 56 is a six degree-of-freedom sensor.

The force/torque sensor 56 is, in turn, connected to an end effector, indicated generally at 58. The end effector 58 is the part of the measurement unit 50 that engages the particular switch 60 (shown in phantom in FIG. 1) being measured and will vary depending upon the type of rotational motion being measured for a particular type of switch. Examples of rotary switches 60 that may be measured are rotary knob and multifunction stalk rotary.

The switch measuring system 20 may also include a switch mounting support 62 for securing the switch 60 while it is being measured. The switch mounting support 62 preferably allows the position of the switch 60 to be adjusted until it is at a desired location relative to the measuring unit 50, and then secures it in place so that the switch housing does not move during testing. The switch mounting support 62 secures the switch housing while minimally affecting the movement characteristics of the switch 60 in order to assure that the measured switch characteristics are accurate.

The switch mounting support may be mounted on a motion table 70, if it is desired to more fully automate the alignment of the switch axis 64 and measurement axis 66. The motion table 70 preferably allows for three degree of freedom movement along three orthogonal axis directions and includes a motion table actuator 72 that can precisely move the motion table 70. The motion table actuator 72 can be controlled by the control unit 22 if one wishes to fully automate the alignment process.

The measurement unit 50 (including the end effector 58) and switch 60 are only illustrated generally in FIG. 1 in order to show an example of an overall setup to which the methods of the present invention can be applied, as discussed below. Thus, the methods discussed may be used with other configurations of a switch measuring system, if so desired.

The control unit 22 determines in which direction, how fast and how far the motor 44 will drive the measurement unit 50. The measurement unit 50 moves the switch 60 over its path of travel while measuring and transmitting the torque measurements to the control unit 22. The motor 44 can cause the switch 60 to move with various velocity profiles over its path, providing a number of torque/angular displacement curves that can be used to define the switch 60.

The rotary switch 60 has a switch axis 64 about which it rotates, and the measurement unit 50 has a measurement axis 66 about which it rotates. Ideally, for accurate measurements, the switch axis 64 and the measurement axis 66 are exactly the same axis. While exact alignment is not practicable, the methods of alignment described herein allow the axes to be aligned sufficiently to minimize the potential errors between the measured torque/angular displacement curves and the actual torque/angular displacement for the switch being measured.

Figure 2A:
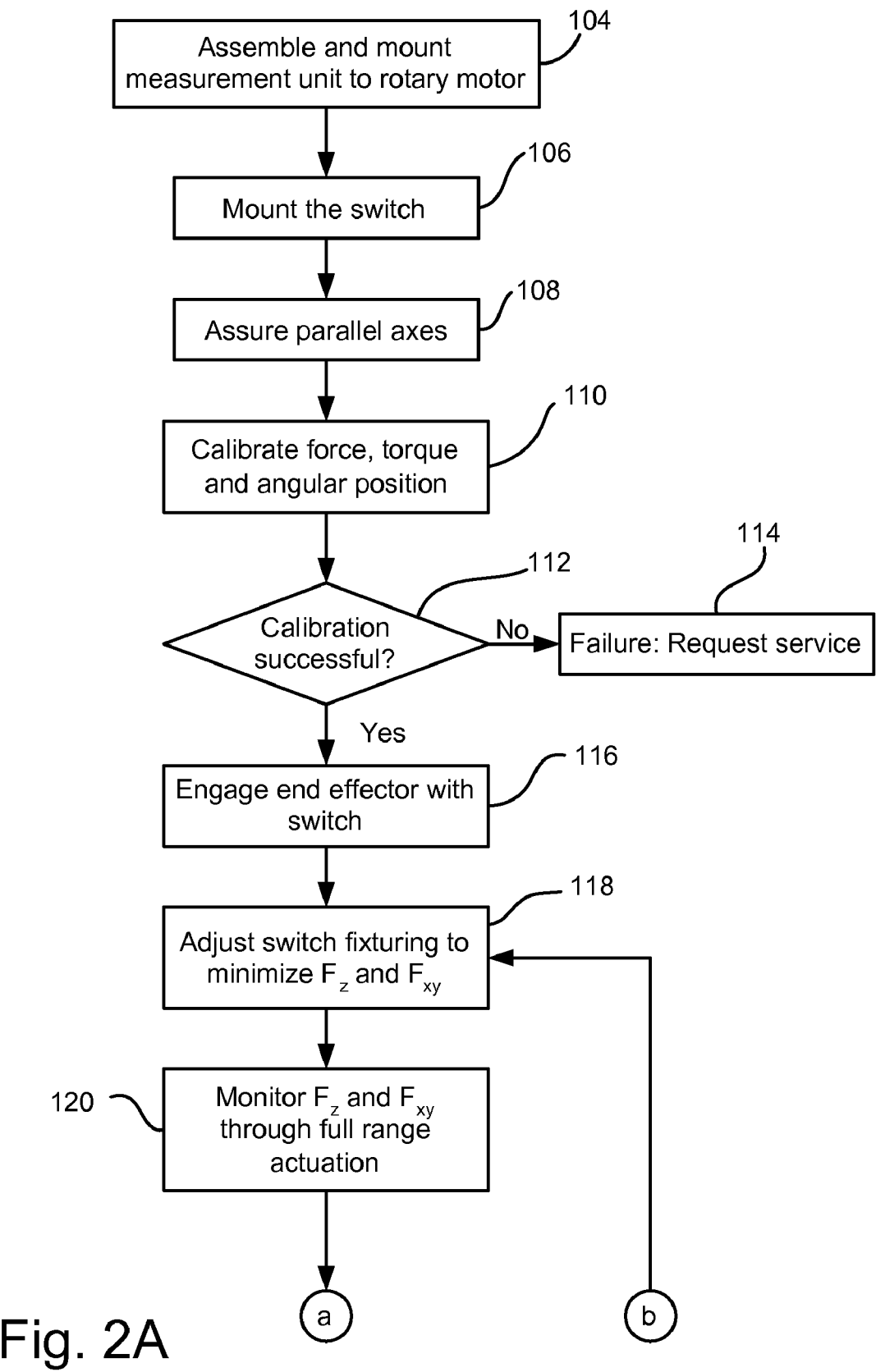
FIGS. 2A and 2B are a flow chart of a switch feel measurement setup and calibration process in accordance an embodiment.
Figure 2B:
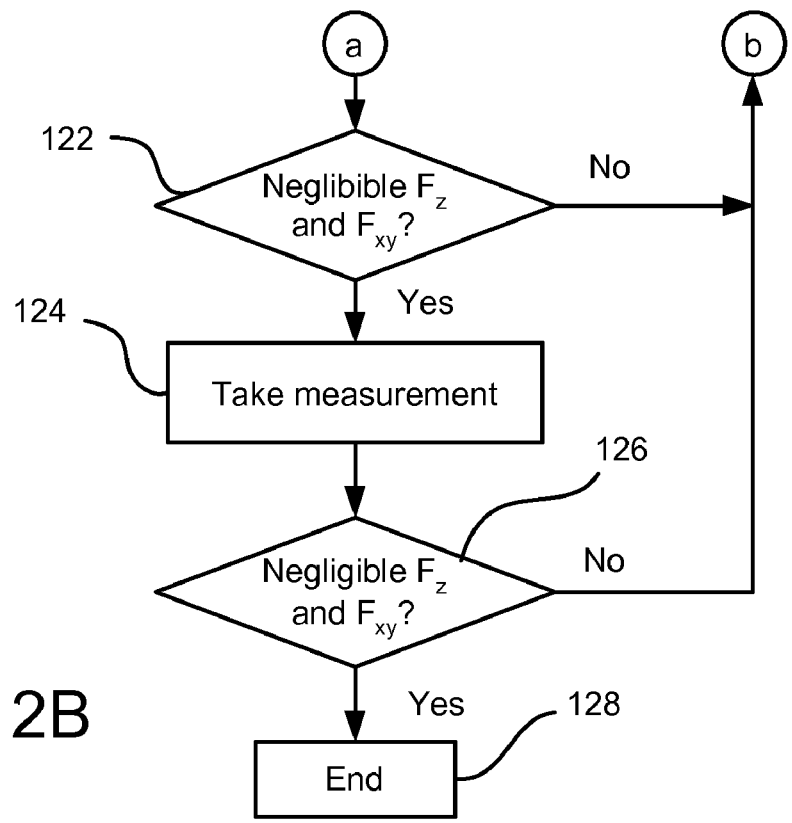

FIGS. 2A and 2B are a flow chart illustrating a process for aligning the measurement axis 66 with the switch axis 64 and using force feedback to assure that the test results are accurate. This process will be discussed as it can be applied to the system of FIG. 1. The measurement unit 50 is assembled (including the appropriate end effector 58 for the particular switch to be measured) and mounted to the shaft 48 of the motor 44, step 104. The particular rotary switch 60 to be measured is mounted in the switch mounting support 62, step 106. The mounting support 62 and measurement unit 50 will generally be set up so that the axes 64, 66 are parallel. If not, then the measurement unit 50 and/or the switch 60 are adjusted to assure that the axes are parallel to each other, step 108.

The switch measurement system is calibrated, step 110. For the position calibration, the rotational angle associated with the rotary motor 44 is reset to zero. For the force and torque calibration, all force and torque readings associated with the force/torque sensor 56 are zeroed-out when the measurement unit 50 is free standing—that is, it is disengaged from any switch to be measured. If any of these values remains significant after the calibration, step 112, then the user will be notified that there is a calibration failure and the system is in need of service, step 114. If not, then the end effector 58 is engaged with the switch 60 to be measured, step 116.

At this point in the setup process it is likely that the measurement axis 66 is not completely aligned with the switch axis 64. The remaining steps in the process of FIGS. 2A and 2B have to do with employing software with the switch measuring system 20 that will use the extra force information provided by the six degrees-of-freedom of the sensor 56 as a quality control feedback. As discussed above, when measuring a switch having a rotational motion, it is important to align the rotational axis 66 of the measurement unit 50 (of which the sensor 56 is a part) with the axis 64 of the switch 60 in order to achieve accurate results. If the alignment is correct, then there should be essentially no axial or side loads that occur during the switch measurement. Thus, measured axial or side loads may be attributed to misalignment, which negatively affects the accuracy of the torque/angular displacement curves for the switch 60. In reality, a certain degree of misalignment always exists, although it may not be visually obvious to the user. For this reason, it is desirable to provide the user with useful feedback that will confirm an accurate switch measurement has been taken.

Figure 3:
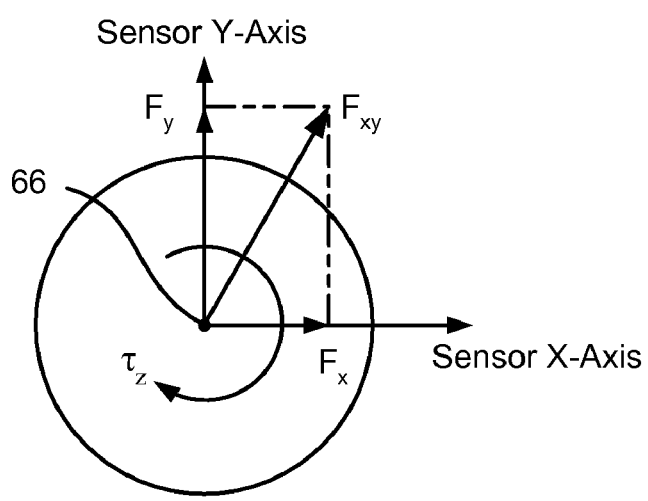
FIG. 3 is a graphical illustration of the force measurements employed with the flow chart of FIG. 2.

FIG. 3 is a graphical illustration of the coordinate system employed when discussing the force and torque measurements detected by the sensor 56 of FIG. 1 as employed in the process discussed relative to FIGS. 2A and 2B. A force $F_x$ is the sensed force along a direction of an X-Axis of the sensor 56, a force $F_y$ is the sensed force along a direction of a Y-Axis of the sensor 56, and a force $F_{xy}$ is a vector sum of the forces $F_x$ and $F_y$ with a magnitude equal to $(F_x^2+F_y^2)^{1/2}$. The torque $\tau_z$ is the sensed torque about a Z-Axis of the sensor, which is the measurement axis 66. A force along the Z-Axis (not shown), then would be $F_z$. It is assumed that the motor shaft 48 has the same axis as the Z-axis 66 of the sensor 56, which is aligned with the axis 64 of the rotary switch 60. The torque $\tau_z$ is the primary load since it will be used for the construction of the travel-effort profile (i.e., torque/angular displacement curves) of the switch 60. Other forces, such as $F_x$, $F_y$, and $F_z$, then, are secondary loads. Under ideal conditions, the secondary forces should all be zero after the system is calibrated. Thus, these secondary forces can be used as indicators of potential problems with the measurement if they are significant, and the undesirable forces sensed by the force/torque sensor 56 can be minimized.

If not already completed in previous steps, the switch fixturing 62 is adjusted to visually align the axes 64, 66, which should reduce the secondary forces $F_z$ and $F_{xy}$, step 118. If later adjustments are needed, then the adjustments in step 118 are based on the measured secondary forces. This can be done manually. However, if automated adjustment is desirable, then the adjustment is made with the motion table 70 via the control unit 22 and motion table actuator 72.

The control unit 22 actuates the measurement unit 50 through its full range of actuation and monitors the force readings received from the force/torque sensor 56, including the secondary forces $F_z$ and $F_{xy}$ (with $F_{xy}$ being a vector sum of the force readings $F_x$ and $F_y$), step 120. The secondary forces $F_z$ and $F_{xy}$ are compared to respective, predetermined, maximum allowable secondary forces to determine if they are each less than the respective maximum allowable force (i.e., negligible), step 122. If not, then additional adjustments need to be made in order to obtain accurate switch measurements.

The amount and direction of adjustment when employing the motion table 70 is based on the magnitudes and directions of the secondary forces. The following is an example of how the motion table 70, in combination with the motion table actuator 72 and control unit 22, may be used to automate the adjustments needed to align the axes 64, 66. For purposes of this example, assume that the normal direction of the table 70 (Z-axis direction) is parallel to the switch and measurement axes 64, 66, and the parallel directions of the table 70 (X-axis and Y-axis directions) are parallel to a plane defined by the sensor X-axis and Y-axis. The secondary force $F_{xy}$ (the vector sum of $F_x$ and $F_y$) may be employed as the feedback information that guides the adjustment of the motion table 70. The maximum magnitude of the secondary force $F_{xy}$ and the switch position where it occurs are identified from the data obtained in step 120. The switch 60 is rotated to this identified switch position. Then, the motion table actuator 72 moves the motion table 70 back and forth in the X-axis direction to minimize the maximum magnitude of the secondary force $F_{xy}$. In addition, the motion table actuator 72 moves the motion table 70 back and forth in the Y-axis direction to minimize the maximum magnitude of the secondary force $F_{xy}$. These last two steps are repeated until the maximum magnitude of the secondary force $F_{xy}$ is minimized. These steps should produce an automated way to obtain an acceptably minimized secondary force.

However, if the minimization obtained by these steps is not sufficient, then additional steps may be performed, if so desired. A rectangular grid for guiding the motion of the motion table 70 may be created. The switch 60 may then be actuated through full ranges of motion while recording the secondary forces $F_{xy}$ for particular vertices of the grid in order to determine which vertex is the best for minimizing the maximum magnitude of the secondary force $F_{xy}$. If so desired, a recursive approach may be applied where the grid is further subdivided around the just determined best vertex and the steps are repeated to find a new best vertex; or the maximum magnitude of the secondary force $F_{xy}$ at each vertex can be fitted with a regression function to determine the best location for the motion table 70 to obtain alignment of the axes 64, 66.

This example of automated alignment of the axes 64, 66 may also include examination of the secondary force $F_z$. A large magnitude of this secondary force may indicate that the contact point between the switch 60 and the end effector 58 has a tendency to move vertically due to, for example, poor craftsmanship of the switch 60. The secondary force $F_z$ is measured through a full range of motion and the maximum magnitude of the secondary force $F_z$ is determined. If it is less than a predetermined maximum acceptable force in the Z-axis direction, then no vertical adjustment of the motion table 70 is made. If not less, and if the maximum magnitude of the secondary force $F_z$ that causes a pull on the sensor 56 is greater than the maximum magnitude of the secondary force $F_z$ that causes a push toward the sensor 56, then the motion table 70 is moved toward the sensor 56. If the opposite is occurs, then move the motion table 70 away from the sensor 56. The amount of vertical movement by the motion table 70 is that sufficient to have a zero mean for $F_z$ relative to the push and pull values just discussed. Then, if so desired, steps 120 and 122 may be repeated to assure that the vertical adjustment of the motion table 70 did not cause the other secondary forces to become larger than their respective predetermined maximum acceptable values.

If, in step 122, the secondary forces are less than the respective maximum allowable forces, then switch measurements are taken to obtain the torque/angular displacement curves for the switch 60, step 124. As a redundant check of the alignment, the secondary forces may also be monitored during the actual switch measurements and compared to assure they remain negligible, step 126. If not, then adjustments are again warranted. If they are negligible, then a measurement for the switch 60 is complete, step 128.

The specific examples of a switch feel measuring system—and methods of aligning, calibrating and monitoring feedback therefrom—discussed herein have been directed to rotary switches, but this system is, of course, applicable to measuring and creating torque/angular displacement profiles for other types of small one degree of freedom mechanisms. Consequently, where the term switch is used herein, this also includes other types of small one degree of freedom mechanisms.

While certain embodiments of the present invention have been described in detail, those familiar with the art to which this invention relates will recognize various alternative designs and embodiments for practicing the invention as defined by the following claims.

What is claimed is:

1. A method for minimizing errors associated with measuring torque/angular displacement profiles of a rotary switch, the method comprising the steps of:
   (a) mounting the rotary switch with a switch axis parallel to a measurement axis for a measurement unit of a switch measuring system;
   (b) moving the rotary switch through a range of motion with the measurement unit while measuring at least one secondary force, wherein the at least one secondary force includes a first secondary force perpendicular to the measurement axis;
   (c) comparing the at least one secondary force to a predetermined force limit; and
   (d) determining that the rotary switch is not properly aligned if the at least one secondary force is not less than the predetermined force limit.

2. The method of claim 1 including a step of calibrating the measurement unit by zeroing out the at least one secondary force before performing step (b).

3. The method of claim 2 wherein steps (b), (c) and (d) are further defined by: the at least one secondary force being a first secondary force perpendicular to the measurement axis and a second secondary force parallel to the measurement axis; the first secondary force being compared to the predetermined force limit, and comparing the second secondary force to a second predetermined force limit; and determining that the rotary switch is not properly aligned if the first secondary force is not less than the predetermined force limit and the second secondary force is not less than the second predetermined force limit.

4. The method of claim 3 wherein the first secondary force is a vector sum of two forces that are normal to each other and normal to the measurement axis.

5. The method of claim 1 wherein steps (b), (c) and (d) are further defined by: the at least one secondary force being a first secondary force perpendicular to the measurement axis and a second secondary force parallel to the measurement axis; the first secondary force being compared to the predetermined force limit, and comparing the second secondary force to a second predetermined force limit; and determining that the rotary switch is not properly aligned if the first secondary force is not less than the predetermined force limit and the second secondary force is not less than the second predetermined force limit.

6. The method of claim 1 wherein the first secondary force perpendicular to the measurement axis is a vector sum of two forces that are normal to each other and normal to the measurement axis.

7. The method of claim 1 further comprising the steps of:
   (e) after step (d), moving the rotary switch through the range of motion with the measurement unit while measuring the at least one secondary force and measuring a torque about the measurement axis relative to an angular displacement;
   (f) comparing the at least one secondary force measured in step (e) to the predetermined force limit; and
   (g) determining that the rotary switch is not properly aligned if the at least one secondary force measured in step (e) is not less than the predetermined force limit.

8. The method of claim 1 including the step of (e) adjusting a position of the switch axis relative to the measurement axis if the determination is made that the rotary switch is not properly aligned.

9. The method of claim 1 including the step of (e) adjusting a position of the switch axis relative to the measurement axis based on a magnitude and a direction of the at least one secondary force, if the determination is made that the rotary switch is not properly aligned.

10. The method of claim 9 wherein step (e) is further defined by a table actuator moving a motion table to accomplish the adjustment of the position of the switch axis relative to the measurement axis.

11. The method of claim 10 wherein step (e) is further defined by a control unit controlling the table actuator based on the magnitude and the direction of the at least one secondary force.

12. A method for aligning a switch axis of a rotary switch to be measured with a measurement axis of a measuring unit of a switch measuring system, the method comprising the steps of:
   (a) mounting the rotary switch with the switch axis parallel to the measurement axis;
   (b) moving the rotary switch through a range of motion with the measurement unit while measuring a first secondary force that is parallel to the measurement axis and a second secondary force that is perpendicular to the switch measurement axis;
   (c) comparing the first secondary force to a first predetermined force limit;
   (d) comparing the second secondary force to a second predetermined force limit; and
   (e) adjusting a position of the switch axis relative to the measurement axis if the first secondary force is not less than the first predetermined force limit or the second secondary force is not less than the second predetermined force limit.

13. The method of claim 12 wherein step (e) is further defined by a table actuator moving a motion table to accomplish the adjustment of the position of the switch axis relative to the measurement axis.

14. The method of claim 13 wherein step (e) is further defined by a control unit controlling the table actuator based on a magnitude and a direction of the first secondary force and a magnitude and a direction of the second secondary force.

15. The method of claim 12 wherein the second secondary force is a vector sum of two forces that are normal to each other and normal to the measurement axis.

16. A method for obtaining feedback indicative of proper alignment of a switch axis of a rotary switch with a measurement axis of a measurement unit of a switch measuring system, the method comprising the steps of:
 (a) mounting the rotary switch;
 (b) moving the rotary switch through a range of motion with the measurement unit while measuring a first secondary force and a second secondary force that is perpendicular to the first secondary force;
 (c) comparing the first secondary force to a first predetermined force limit;
 (d) comparing the second secondary force to a second predetermined force limit; and
 (e) determining that the rotary switch is not properly aligned with the measurement unit if the first secondary force is greater than the first predetermined force limit or the second secondary force is greater than the second predetermined force limit.

17. The method of claim 13 further defined by: the first secondary force being parallel to the measurement axis and the second secondary force being perpendicular to the measurement axis.

18. The method of claim 16 wherein the second secondary force is a vector sum of two forces that are normal to each other and normal to the measurement axis.

19. The method of claim 16 further including the steps of:
 (e) axially realigning the switch axis with the measurement axis if the rotary switch is determined to be not properly aligned with the measurement unit; and repeating steps (b) through (e).

\* \* \* \* \*